United States Patent [19]

Buhler

[11] Patent Number: 4,963,789
[45] Date of Patent: Oct. 16, 1990

[54] METHOD AND APPARATUS FOR DYNAMIC MAGNETIC FIELD NEUTRALIZATION

[75] Inventor: Frederick T. Buhler, Providence, R.I.
[73] Assignee: Conrac SCD, Inc., Durate, Calif.
[21] Appl. No.: 345,575
[22] Filed: May 1, 1989
[51] Int. Cl.$^5$ ............................................ H01J 29/06
[52] U.S. Cl. ...................................................... 315/8
[58] Field of Search ................................... 315/8, 370

[56] References Cited

U.S. PATENT DOCUMENTS

| | | | |
|---|---|---|---|
| 2,925,524 | 2/1960 | Heil | 315/8 |
| 2,962,622 | 11/1960 | Popovich | 315/8 |
| 3,340,443 | 9/1967 | Rieth et al. | 315/8 |
| 3,404,307 | 10/1968 | Hayden | 315/8 |
| 3,757,154 | 9/1973 | Okita et al. | 315/8 |
| 4,380,716 | 6/1983 | Romeo et al. | 315/8 |
| 4,458,178 | 6/1984 | Tenney et al. | 315/8 |

FOREIGN PATENT DOCUMENTS 2809725 9/1979 Fed. Rep. of Germany.
0047321 4/1977 Japan.

OTHER PUBLICATIONS

"The Evolution of the Modern Electronic Compass" by Martin A. Kits van Heyningen, NMEA News, Jan.-/Feb. 1987.

Primary Examiner—Robert J. Pascal
Attorney, Agent, or Firm—Lahive & Cockfield

[57] ABSTRACT

A method and apparatus for nulling the magnetic field within a specified volume in the presence of an external ambient field by generating compensating magnetic fields at a number of locations around the volume, sensing the field in the volume and controlling the value of the compensating fields in a closed loop system to null the field within the volume.

12 Claims, 2 Drawing Sheets

METHOD AND APPARATUS FOR DYNAMIC MAGNETIC FIELD NEUTRALIZATION

FIELD OF THE INVENTION

This invention relates in general to a method and apparatus for controlling the magnetic field within a specified volume in an extended ambient magnetic field and more particularly to a method and apparatus which employ active magnetic field generators controlled by feedback control loops to compensate for the ambient magnetic field, thereby nulling the magnetic field within the specified volume.

BACKGROUND OF THE INVENTION

The need for controlling the value of the magnetic field within a specified volume exposed to a significant ambient magnetic field, which may also be varying, arises in a number of situations. One such situation, for example, is a cathode ray tube (CRT) monitor in which the electron beam of the cathode ray tube gun is deflected magnetically to scan with precision the phosphor face of the monitor. The precision requirement is even more demanding with a color screen which requires electrons to strike the phosphor to produce specific colors by passing through holes in a shadow mask at precise angles to strike only the intended color phosphor. There have been a number of approaches employed to compensate for the effects of the extended ambient magnetic field in the operation of such monitors. Of course, one straightforward approach is the use of passive magnetic shielding. However, this is limited both as to the magnitude of field it is practical to shield, and also by the inability to surround the entire volume with shielding.

Another approach has involved the use of electrical coils positioned around the monitor, which coils are energized to produce appropriate magnetic fields. In some instances, such as that described in U.S. Pat. No. 2,925,524 the fields so generated are preadjusted before the monitor is placed in operation. Another approach is described in U.S. Pat. No. 4,380,716 in which patterns at the corners of the phosphor screen are generated by a specific portion of the electron beam output path. Changes in these patterns due to changes in the ambient magnetic field are sensed by optical sensors, which in turn control the current flow through the coils, providing only axial correction. Still another approach (described in U.S. Pat. No. 3,757,154) utilizes magnetic sensors placed in a bridge to control the current flow through correcting coils. This arrangement is, however, open looped and, accordingly cannot produce magnetic fields under positive control to accomplish the compensation function.

It is therefore an object of the present invention to provide active magnetic field generators, for nulling the magnetic field within a specific volume within an ambient external field, with the energizing current for the generators being controlled by the value of magnetic field measured by a number of sensors, all included in a feedback control loop.

It is another object of this invention to provide a method for controlling the magnetic field value within a specified volume by placing magnetic field generators at specific locations around said volume together with magnetic sensors at corresponding locations and using the signals from the magnetic sensors in a closed loop feedback circuit, together with a programmable processor to maintain the magnetic field within the specified volume at the specified value.

SUMMARY OF THE INVENTION

Broadly speaking, in the present invention a method and apparatus is provided for controlling the value of the magnetic field within a specified volume in the presence of a large and perhaps varying ambient magnetic field, by generating, through a series of magnetic generators, compensating magnetic fields, where the value of these fields is controlled in a feedback control loop to null the magnetic field within the volume. In one example where the specified volume is a CRT monitor, such generators, each with its associated magnetic field sensor, are placed at the top, bottom and each side of the face of the monitor, together with a coil for generating an axially aligned magnetic field, and corresponding magnetic sensor. The current flow through the coils is controlled in a feedback control circuit to maintain the magnetic field at these locations at zero despite variations in both amplitude and direction of ambient magnetic fields.

The system may also include a passive magnetic shield outside of the magnetic field generators and a deperming coil operated in a specific operational sequence to demagnetize any elements of the system that may tend to become permanently magnetized.

DESCRIPTION OF PREFERRED EMBODIMENT

Figure 1:
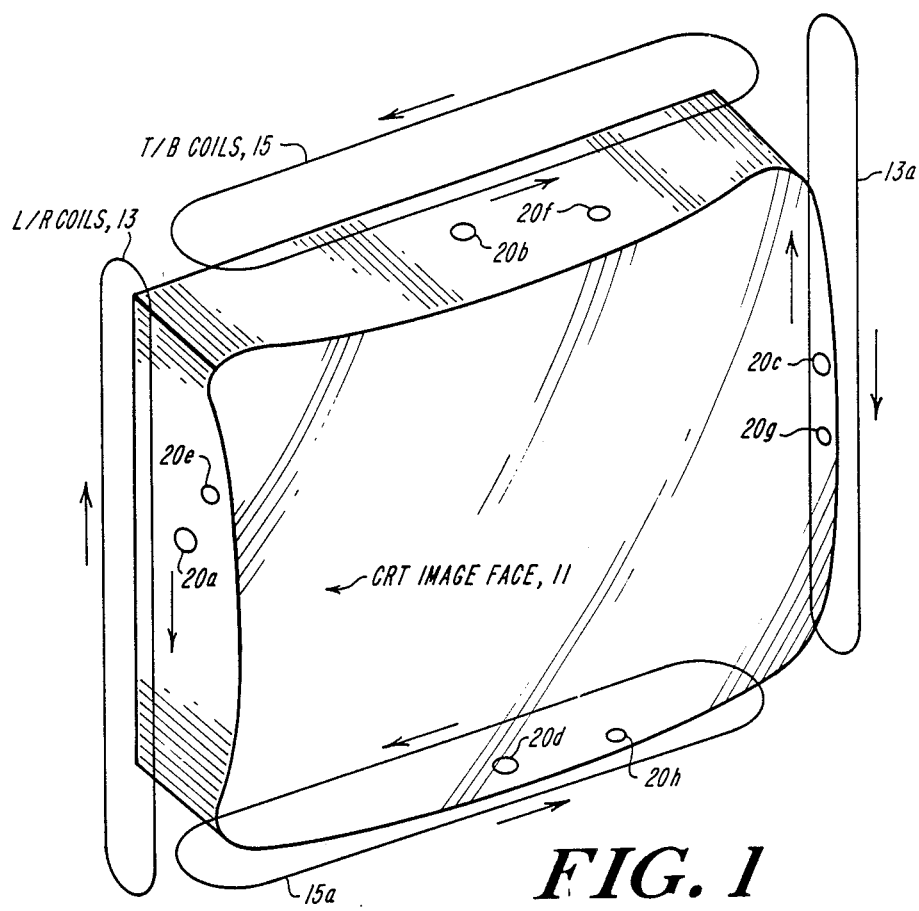
FIG. 1 is an illustration generally in schematic form of the placement of magnetic field Producing coils around the face of a cathode ray tube monitor in a preferred embodiment of this invention.

The specific embodiment described is a high resolution color monitor which produces a rectangular image on a shadow mask CRT which has precision in line electron guns. These electron guns produce three electron beams accelerated to 25 Kev. The functioning of the CRT depends on precise control of magnetic fields along the paths of these beams since an electron moving through a magnetic field is deflected by an acceleration perpendicular to both its own velocity vector and to the component of the magnetic field vector perpendicular to its path. This principle is used to scan the image area at the CRT's light emitting phosphor screen by producing magnetic fields with electromagnets placed near the electron guns which are at the rear of the CRT. Alignment of the three electron beams so that they will all converge at the same spot on the phosphor screen also depends on magnetic fields in the gun area. The three beams pass through a shadow mask placed approximately half an inch behind the phosphor screen. The shadow mask has an array of small holes through it in an extended hexagonal pattern. The center of each hole is about 0.26 mm from the center of its nearest neighbor holes. For each hole in the mask there are three dots of phosphor on the CRT screen. These dots each emit a different color of light - red, green, or blue - when struck by high energy electrons. When properly aligned, the beams travel through the holes at different angles so that one beam strikes only red, one only green, and one only blue emitting dots. Conditions which disrupt this alignment cause loss of color purity; i.e. the colors of the image are incorrect. The angle at which the electrons pass through the mask or their subsequent path can be adversely affected by stray magnetic fields causing loss of color purity.

The system described below which is illustrated in FIGS. 1 through 4 provides a neutral magnetic field in the volume occupied by the CRT and its yoke, despite ambient magnetic fields of value up to 5 oersted, which may vary at a rate of 20 oersteds per second. It also includes a deperming feature which provides for restoration of neutral magnetization within the volume after a temporary field as high as 20 oersteds has been impressed and removed.

The system of this invention neutralizes the effects of external magnetic field by employing both passive and active means. The passive magnetic shield surrounds the CRT and yoke and extends forward a few inches beyond the CRT face. The shield is also spaced about the same distance from the image area on the right and left sides with a slightly smaller spacing between it and the image area at the top and bottom of the screen. Since the image area cannot be obscured the shield is entirely open at the front. While the shield conforms generally to the CRT yoke outline, it must be sufficiently separated from the yoke so as not distort the deflection fields or adversely load the circuits which drive the yoke. The shield may, for example, be fabricated from 80% moly-permalloy which is typically 0.06 inches thick, except that the front four inches of the shield may be formed with a double layer to insure that the shield is not saturated by edge effects.

The magnetic shield is designed so that it does not saturate when placed in randomly oriented magnetic fields up to 6 oersteds strength. This results in significantly reduced magnetic fields within the volume which have the following properties. At each point the function describing the magnetic field orientation and magnitude is determined entirely by the orientation and magnitude of the ambient vector. That function is the same for all external fields of the same orientation except for a scalar constant which is proportional to the magnitude of the external field. The function describing the internal magnetic field distribution is composed of the vector sun of three functions which would individually be generated by three mutually perpendicular ambient vectors whose sum is equal to the actual ambient vector.

Figure 2:
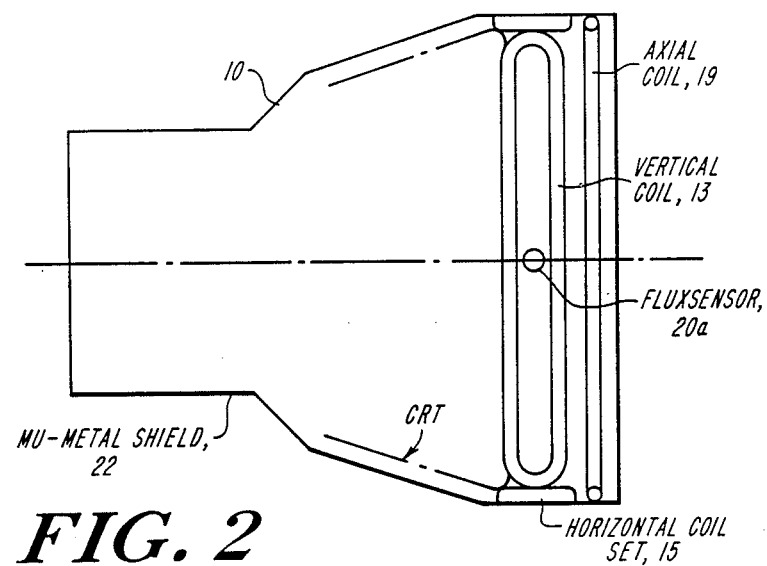
FIG. 2 is an illustration in perspective view of the placement of coils and sensors in the embodiment of FIG. 1.
Figure 3:
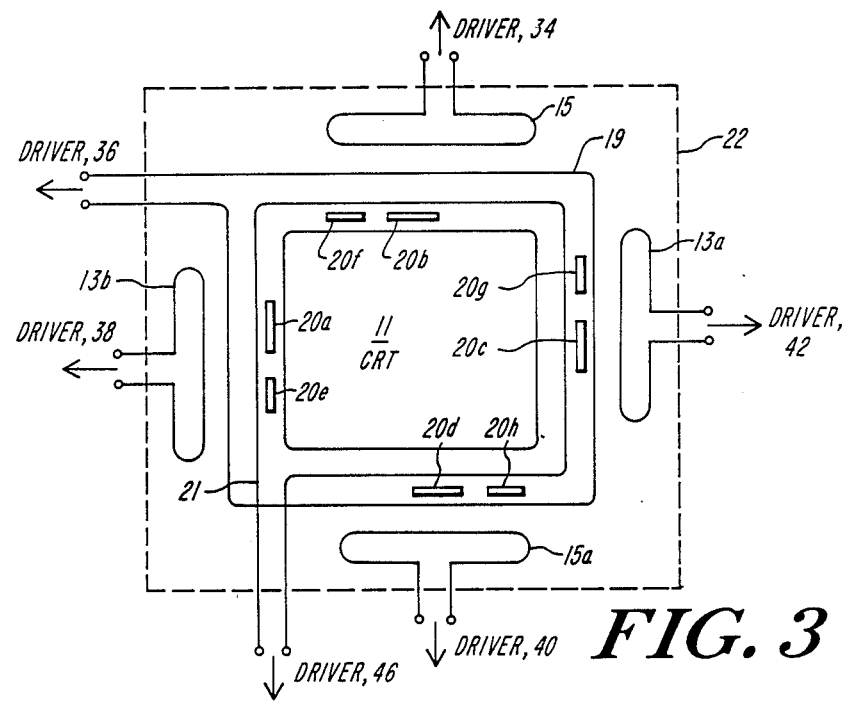
FIG. 3 is an illustration generally in schematic form of a more detailed illustration of the embodiment of FIG. 1.

In the active neutralizing system, electric current is driven through coils placed inside the shield. As illustrated in FIGS. 1 and 2 the magnetic field generating means includes a pair of vertically oriented coils 13 and 13a on either side of the image face 11 of CRT 10. Horizontal coils 15 and 15a are located at the top and bottom edges of the image face and, as is illustrated in FIGS. 2 and 3, an additional coil 19 is provided having its magnetic field vector along the axis running from the CRT image face back to the electron guns.

Each of the coils has associated with it in a close position, one or more magnetic flux sensors 20.

Each of the five coils is designed such that a drive range from +0.4 amps to −0.4 amps at a voltage from +12 volts to −12 volts compensates for external fields which may vary from 5 oersteds to −5 oersteds along any one of the three orthogonal axes.

This design is based on the premise that by properly distributing the conductors of the compensation coils within the volume, they will generate compensating fields which have the following properties. When driven by identical currents, the pair of compensation coils 13 and 13a placed at the left and right side of the volume should generate a field pattern which closely approximates the form of the internal function of the external vector which is along the left-right axis of the shield, with the amplitude of the function being proportional to the drive current through the coils. A similar relationship holds for the compensating coils 15 and 15a placed at the top and bottom of the volume with respect to external vectors along the top-bottom axis of the shield. This is also true for the compensating coil 19 producing a field along the front-back axis of the shield with respect to external ambient vectors on that axis. By appropriately controlling the currents in the compensating coils so that the compensating fields are of equal magnitude but opposite sign to the fields induced by the three components of the external ambient vector, the field inside the shield is essentially nulled throughout its volume. As shown, in order to accommodate some non-uniformity in the external field the circuits driving compensating coils at the left, right, top, bottom and axial locations are free to act independently.

The shape and size of the coils should be selected to optimize system performance for a shield of any particular shape and size. The process can best be determined empirically, employing the following method.

The magnetic field induced at a significant number of points throughout the volume by external vectors along each of the three axes of interest is measured. This is done at a number of values over the range of values (+/− 5 Oe) which the ambient vector may assume to confirm that the distribution is of constant form and proportional to the ambient strength. A number of subcoils are placed within the volume and individually driven with electrical current. The magnetic fields that the subcoils produce are measured at these same points throughout the volume. Then, by conventional techniques, the optimum linear combination of the proper number of turns for each subcoil is calculated on the basis that they will be grouped into five sets (left, right, top, bottom, axial) and that all subcoils in a particular set will be placed in series and therefore carry the same current. The shape and size of the subcoils are then altered until an acceptable distribution is achieved; i.e. one which approximates the fields induced by ambient vectors to a degree which will provide nulling throughout the volume to within acceptable limits. The subcoils are then combined into the five compensating coils and the conductor distribution patterns within the coils are further smoothed to provide correcting fields with the least departure from the distributions functions being compensated.

The placement and orientation of the magnetic sensors is also important to the success of this system. From empirical data on the fully assembled CRT display, points around the perimeter of the front (open surface of the shield) of the monitor are identified which have the following property: The magnetic vector in a particular orientation at these points is significantly affected by only one of the three mutually perpendicular ambient vectors discussed above. Directional sensors are placed at these identified points for the left-right axis near the coils at the left and right side of the monitor. The sensors are oriented in the direction sensitive only to the left-right ambient vector. The location of these points is further optimized by selecting locations at which the sensors exhibit the highest sensitivity to the ambient vector. Points with similar characteristics for the up-down axis are selected for placement of sensors associated with the compensation coils at the top and bottom of the shield. An additional four sensors are located at the top, bottom, left and right of the monitor at points and in directions where they are most sensitive to changes in the ambient vector along the front-back axis of the shield.

Since the CRT contains both a shadow mask and an internal magnetic shield which can be internally magnetized to some degree, the system includes a provision for deperming (degaussing) these elements. This magnetization deperming is effected by providing means for magnetizing the mask and shield to saturation alternately in one polarity and then the other with a deperming electromagnetic coil which surrounds the CRT. The amplitude of this alternating magnetic field is diminished to zero over an extended number of cycles.

FIG. 3 illustrates the specific layout viewed from the front of the CRT, of the compensating vertical coils 13 and 13a and horizontal coils 15 and 15a , together with the axial compensating coil 19. A deperming coil 21 is also included. All of this assembly is enclosed within a magnetic shield 22.

Figure 4:
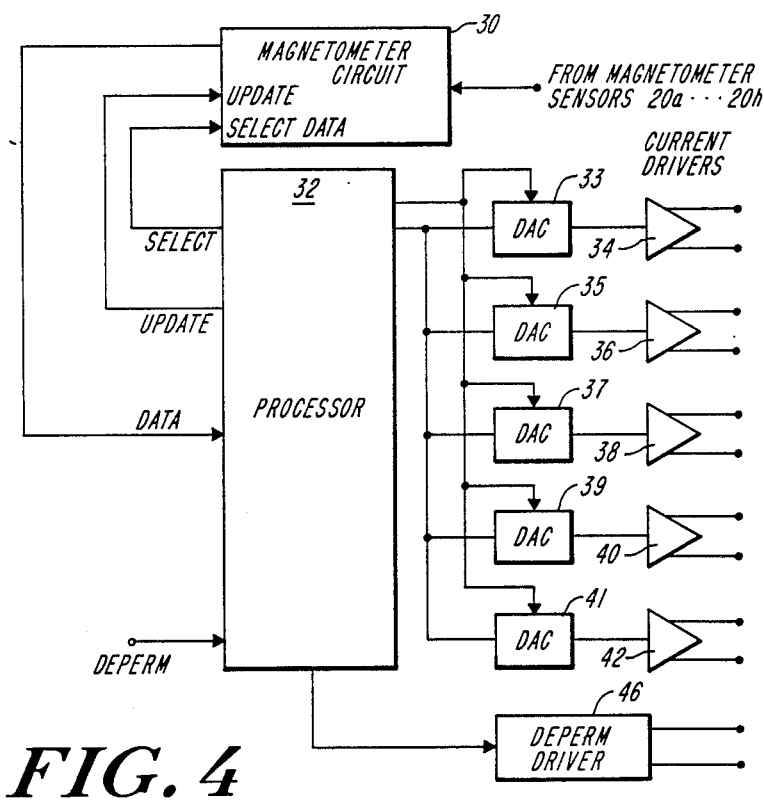
FIG. 4 is an illustration in block diagrammatic form of a control circuit for operation in conjunction with the apparatus illustrated in FIG. 3.

In FIG. 4 there is illustrated a block diagram of a suitable control circuit for operation of this magnetic field neutralizing system. The entire electronic system is controlled by a processor 32 which receives input data from magnetometer signal processing electronics 30 and from each manually operated deperm initiation button or an automatic deperming initiation circuit. The magnetometer signal processing circuit receives, as an input, signals from each of the magnetometer sensors 20a through 20h. Outputs from the processor are provided through digital to analog converters 33, 35, 37, 39 and 41 to respective current driving amplifiers 34, 36 38, 40 and 42. Each of the current driving amplifiers are coupled to one of the coils as indicated. In operation, the processor 32 periodically polls the magnetometer signal processing circuit 30 for an update of the value of the signals from each of the magnetometer sensors. If the sensors give other than a zero reading, then the processor commands the current drivers to adjust the current in the compensating coils to drive the field near that sensor to zero. In essence, the system forms a closed loop which employs the sensed magnitude and direction of the ambient field to develop a required compensating magnetic field by means of the compensating coils.

While a single cycle of the deperming operation is carried out as a result of manual initiation, this process is carried out automatically by the processor 32 when the system is energized following a period of inactivity. In such an operation the initiation of the deperming operation would take place after several cycles of nulling the sensor readings by virtue of the compensating magnetic fields and then, holding the compensation constant, the deperming coil 19 would be operated for degaussing the internal magnetizable elements of the CRT. During the deperming operation the inputs to the compensating coils are held constant by using a sample and hold circuit at the output of the sensors 20a through 20d, thereby providing that the deperming action does not disrupt the operation of the compensation circuits. With this arrangement the correcting field remains active during deperming. If this were not done the CRT would itself be magnetized during the deperming cycle. A suitable number of cycles for this deperming operation has been found to be 10. An initial amplitude of the deperming field is approximately 20 oersteds, requiring about 2000 ampere turns in the deperming coil 19. This magnitude of deperming will remove permanent magnetization which may have been produced by fields up to 20 oersteds.

Having described the invention improvements and modifications will occur to those skilled in the art. The invention is defined by the attached claims.

I claim:

1. A method for nulling the magnetic field within a specified volume in the presence of an external ambient magnetic field comprising the steps of:
   generating magnetic fields at a plurality of locations around said specified volume;
   sensing the value of the magnetic field at a plurality of locations around said specific volume;
   employing the sensed value of said magnetic field on a substantially continuous basis to control the value of said generated magnetic fields to null the value of the magnetic field within said specific volume.

2. A method in accordance with claim 1 and further including the step of surrounding said specific volume with a passive magnetic shield located externally of said magnetic field generators.

3. A method in accordance with claim 2 and further including generating a deperming field controlled on a specified schedule to deperm any elements within the volume surrounded by said passive magnetic shield which had acquired a permanent magnetic field.

4. A method in accordance with claim 2 wherein said magnetic fields are each generated by compensation coils, each formed and positioned to generate its magnetic field to compensate for a vector of said external magnetic field along one of three mutually perpendicular axes.

5. A method in accordance with claim 4 wherein the value of the magnetic field generated by each compensation coil is sensed by separate sensor means positioned to respond primarily only to the magnetic field generated by one of said coils.

6. A method in accordance with claim 5 wherein the sensed value from each sensor means is employed to control only the coil generating the magnetic field to which it is primarily responding.

7. Apparatus for nulling the magnetic field within a specific volume in an external ambient magnetic field comprising:
   a plurality of magnetic field generating elements placed in specific locations around said volume;
   a plurality of magnetic field sensing elements placed at specific locations around said specific volume for sensing the value of the magnetic field within said volume;
   control means for controlling on a substantially continuous basis the value of the magnetic fields generated by each of said plurality of magnetic field generators;
   means for coupling output signals from each of said ma field sensors indicating the value of its sensed magnetic field to said control means, said control means being arranged to control the value of the magnetic field generated by each of the magnetic field generators in response to said sensed magnetic field signals to null the magnetic field within said specific volume.

8. Apparatus in accordance with claim 4 and further including a magnetic deperming element positioned to demagnetize elements within said specific volume which acquire a permanent magnetization, the sequence of operation of said deperming element being controlled by said control means.

9. Apparatus for nulling the magnetic field within a specific volume in an external ambient magnetic field comprising:
   a plurality of magnetic field generating elements placed in specific locations around said volume, each for generating a magnetic field along one of three orthogonally related axes;
   a plurality of separate magnetic field sensing means placed at specific locations around said specific volume each for sensing primarily the value of the magnetic field within said volume generated by one of said magnetic field generating elements;
   a passive magnetic shield located externally of said magnetic field generators and said magnetic field sensors and surrounding said specific volume;
   control means for controlling on a substantially continuous basis the value of the magnetic fields generated by each of said plurality of magnetic field generators;
   means for coupling output signals from each of said magnetic field sensing means indicating the value of its sensed magnetic field to said control means, said control means being arranged to control the value of the magnetic field generator generating the field which said sensor means primarily senses to null the magnetic field within said specific volume.

10. Apparatus in accordance with claim 9 and further including a magnetic deperming element positioned to demagnetize elements within said specific volume which acquire a permanent magnetization, the sequence of operation of said deperming element being controlled by said control means.

11. Apparatus in accordance with claim 9 wherein said magnetic field generators are compensation coils.

12. Apparatus in accordance with either of claims 9 or 11, wherein said specific volume is a cathode ray tube having a generally rectangular face and wherein said magnetic field generating elements are each placed next to one of the sides of said rectangle, and to produce a field along an axis through said cathode ray tube normal to the face of said tube.

* * * * *